(12) United States Patent
Mitsui

(10) Patent No.: US 7,151,855 B2
(45) Date of Patent: *Dec. 19, 2006

(54) PATTERN MEASUREMENT METHOD, MANUFACTURING METHOD OF SEMICONDUCTOR DEVICE, PATTERN MEASUREMENT APPARATUS, AND PROGRAM

(75) Inventor: Tadashi Mitsui, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

This patent is subject to a terminal disclaimer.

(21) Appl. No.: 10/670,387

(22) Filed: Sep. 26, 2003

(65) Prior Publication Data

US 2004/0131257 A1 Jul. 8, 2004

(30) Foreign Application Priority Data

Sep. 26, 2002 (JP) .............................. 2002-281572

(51) Int. Cl.
*G06K 9/46* (2006.01)
(52) U.S. Cl. ............ 382/203; 250/559.22; 250/559.36; 382/144; 382/145; 382/199
(58) Field of Classification Search ........... 250/559.22, 250/559.36; 382/144, 145, 199, 203
See application file for complete search history.

(56) References Cited

U.S. PATENT DOCUMENTS

| 5,872,863 A | * | 2/1999 | Tsuboi et al. ............... 382/151 |
|---|---|---|---|
| 6,061,283 A | * | 5/2000 | Takahashi et al. .......... 365/201 |
| 6,338,000 B1 | * | 1/2002 | Nakajima et al. ............. 700/97 |
| 6,510,360 B1 | * | 1/2003 | Kaymer et al. ............. 700/138 |
| 6,529,258 B1 | * | 3/2003 | Watanabe et al. ........... 349/143 |
| 6,549,648 B1 | * | 4/2003 | Rinn ......................... 382/151 |
| 6,760,892 B1 | * | 7/2004 | Taoka et al. ................... 716/4 |
| 6,839,470 B1 | * | 1/2005 | Ikeda ......................... 382/266 |
| 6,925,403 B1 | * | 8/2005 | Nowak ........................ 702/94 |
| 7,054,506 B1 | * | 5/2006 | Ikku ........................... 382/286 |
| 2002/0141647 A1 | | 10/2002 | Mitsui |

FOREIGN PATENT DOCUMENTS

JP  2002-288677  10/2002

* cited by examiner

*Primary Examiner*—Gregory Desire
(74) *Attorney, Agent, or Firm*—Finnegan, Henderson, Farabow, Garrett & Dunner, L.L.P.

(57) ABSTRACT

A pattern measurement method includes acquiring graphic data of a plurality of patterns including image data; processing the graphic data to detect a coordinate of an edge point of the pattern; combining the edge points between the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points; and evaluating at least one of a relation of shape between the patterns, a relation of size between the patterns, and a relative location between the patterns on the basis of the prepared distance angle distribution map.

30 Claims, 14 Drawing Sheets

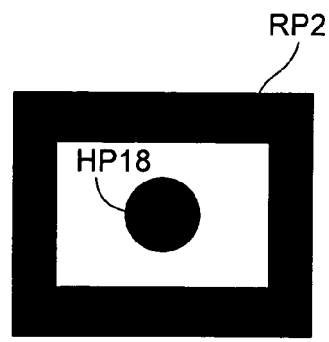
FIG. 14
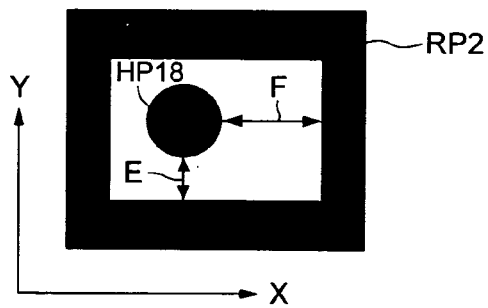
FIG. 15
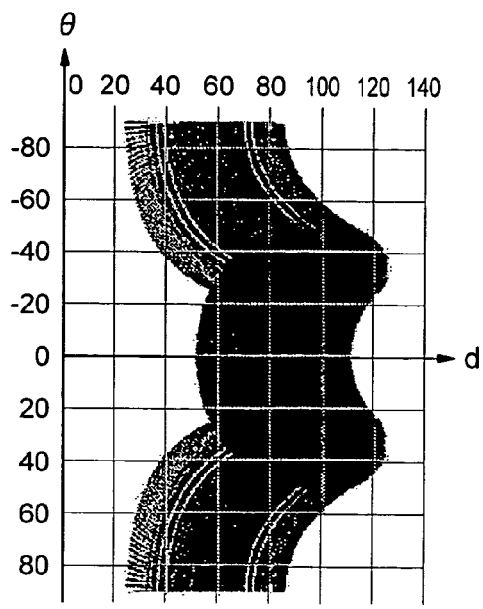    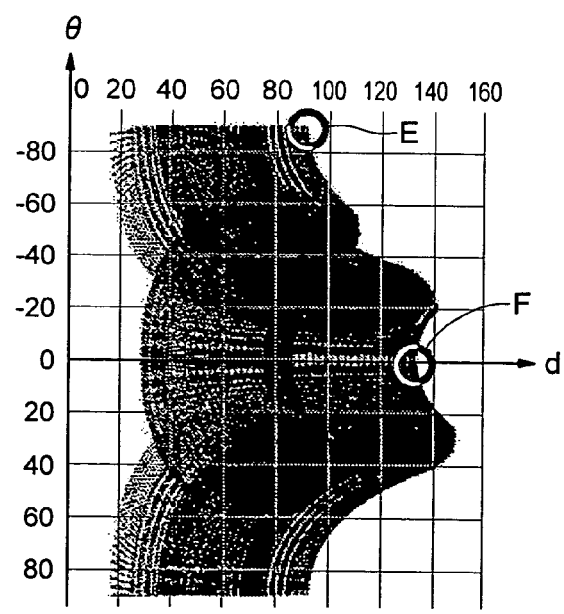
FIG. 16A              FIG. 16B

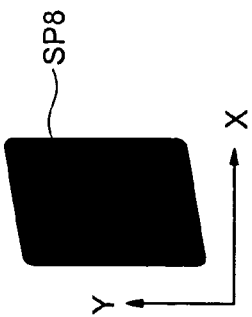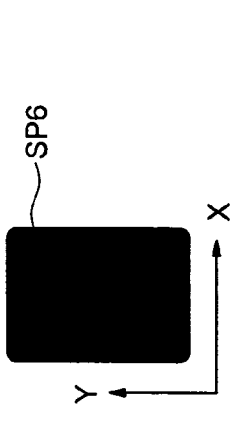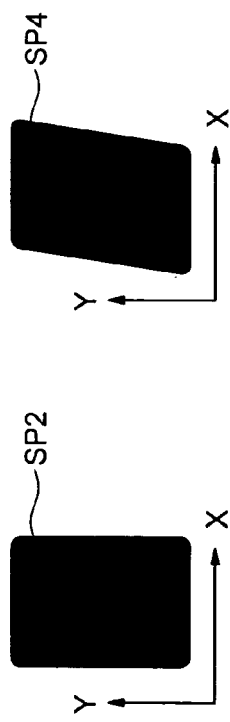
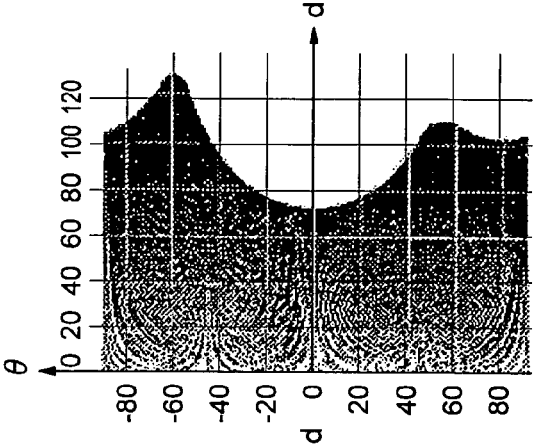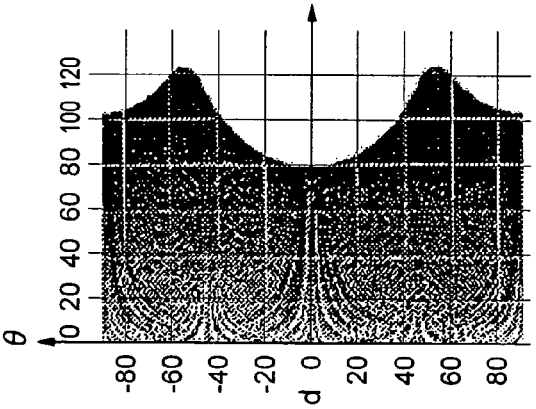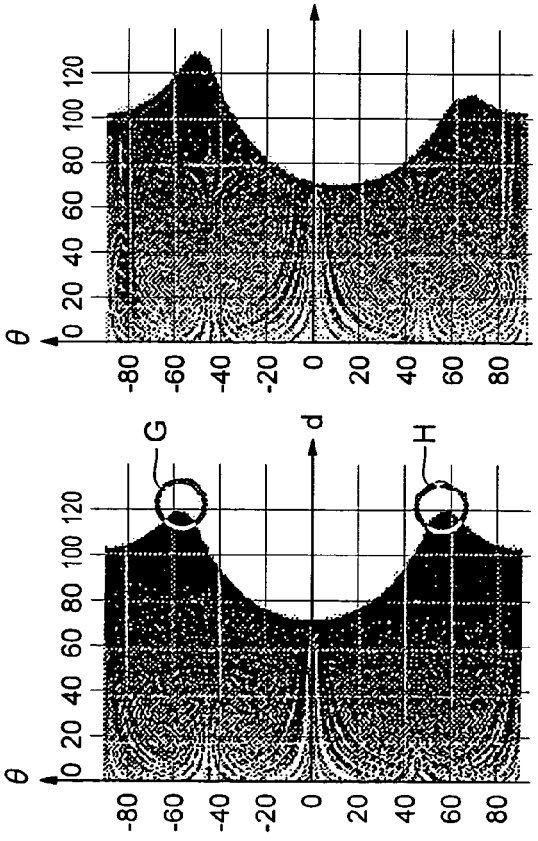
FIG. 17A STANDARD GRAPHIC
FIG. 17B 10° RIGHTWARD
FIG. 17C 10% BROADER
FIG. 17D 10° UPWARD
FIG. 17E
FIG. 17F
FIG. 17G
FIG. 17H

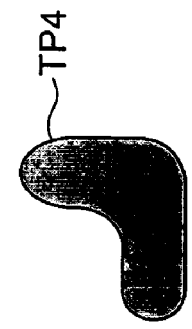
FIG. 23C
R=0.705
FIG. 23B
R=0.943
FIG. 23A
R=1
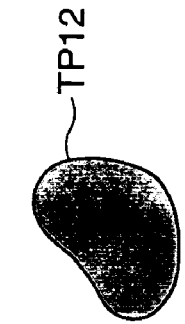
FIG. 23F
R=0.294
FIG. 23E
R=0.292
FIG. 23D
R=0.354
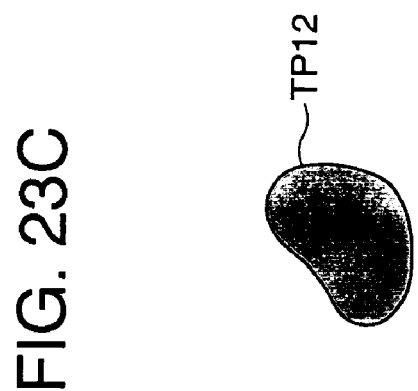

PATTERN MEASUREMENT METHOD, MANUFACTURING METHOD OF SEMICONDUCTOR DEVICE, PATTERN MEASUREMENT APPARATUS, AND PROGRAM

CROSS REFERENCE TO RELATED APPLICATION

This application claims benefit of priority under 35USC §119 to Japanese Patent Application No. 2002-281572, filed on Sep. 26, 2002, the contents of which are incorporated by reference herein.

BACKGROUND OF THE INVENTION

1. Field of the Invention

The present invention relates to a pattern measurement method, a manufacturing method of a semiconductor device, a pattern measurement apparatus, and a program.

2. Related Background Art

As general methods of measuring patterns, various techniques have been proposed and improved. For example, in a field of a semiconductor integrated circuit, a dimension measurement has been carried out using a critical dimension scanning electron microscope (CDSEM) in order to evaluate a fine pattern of a semiconductor. In this dimension measurement, a distance between two edge points of a pattern is only obtained. In order to evaluate a shape of the pattern from obtained results of the dimension measurement, dimensions of a plurality of portions of the pattern are measured, and an amount defined as the pattern shape has to be calculated on the basis of the measurement results. This will be described with reference to an example of an elliptic pattern shown in FIG. 25. It is to be noted that in the following drawings, the same components are denoted with the same reference numerals, and the description of the same components will be appropriately omitted.

In the example shown in FIG. 25, a dimension a in the longitudinal directions and a dimension b in the lateral directions of an elliptic pattern HP50 are separately measured, and these values or values calculated from these values in accordance with a certain calculation rule are outputted as a pattern shape. The calculation rule includes, for example, an area and oblateness of an elliptic pattern given by $A=\pi ab$, $e=a/b$, and the like. When one or several amounts are defined as the pattern shape in this manner, there is a merit that a person who measures the pattern can intuitively and easily understand the pattern shape.

However, the above-described pattern measurement method has a problem that an accurate shape cannot be represented, when the shape of the measurement target pattern cannot be represented by a certain mathematical equation. For example, there are also patterns such as patterns HP52 and HP54 of FIG. 26 which have the same oblateness e as that of the elliptic pattern HP50 of FIG. 25 but which have mutually different areas. Furthermore, in a case shown in FIG. 25, short and long axes of the elliptic pattern HP50 agree with X and Y-axes directions of an image, but otherwise, there is a problem that short and long diameters of the elliptic pattern cannot be measured by dimension measurement in the X and Y-axes directions.

To solve the problem, it is also necessary in the measurement of the pattern diameter to carry out the dimension measurement in a direction of, for example, ±45 degrees in addition to measurement directions of 0 and 90 degrees. In this technique, however, a measurement process becomes complicated, but measurement accuracy of the pattern shape is not enhanced as expected. For example, when the diameter is measured at eight portions every 22.5 degrees from 0 degree to 180 degrees, operation of the measurement is octuplicated. However, the pattern shape is approximated as 16-gonal shape, and this is the remarkably rough measurement as approximation of a general hole pattern shape.

In addition, there is also a problem that specifications have to be checked with respect to eight measurement values as parameters which equivalently represent the pattern shape in order to evaluate the shape of the pattern.

Furthermore, for example, in fine pattern evaluation in an actual manufacturing process of a semiconductor, for example, instead of numerically describing the shape by the diameter of the hole pattern, in many cases it is necessary and sufficient only to represent a degree of difference between the patterns as an index on the basis of a normally formed pattern, or another adjacent hole pattern. Especially when an influence of an aberration of an exposure apparatus for transferring the pattern is checked, it is important to evaluate a shape difference between the adjacent patterns. In the above-described conventional method, since the dimension is measured in eight directions, a measurement time increases, and further twice the measurement time is required for measuring the shape difference between the adjacent patterns.

This problem increases a load onto a central processing unit (CPU) of a computer to carry out measurement, trouble of measurement management, and measurement time, and is additionally one of causes for an increase of cost in shape measurement.

BRIEF SUMMARY OF THE INVENTION

According to a first aspect of the present invention, there is provided a pattern measurement method comprising:

acquiring graphic data of a plurality of patterns including image data;

processing the graphic data to detect a coordinate of an edge point of the pattern;

combining the edge points between the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points; and evaluating at least one of a relation of shape between the patterns, a relation of size between the patterns, and a relative location between the patterns on the basis of the prepared distance angle distribution map.

According to a second aspect of the present invention, there is provided a pattern measurement method comprising:

acquiring graphic data of a plurality of patterns including image data;

processing the graphic data to detect a coordinate of an edge point of the pattern;

combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and extracting a characteristic point of the distance angle distribution map to evaluate at least one of a relation of shape between the patterns, a relation of size between the patterns, and a relative location between the patterns on the basis of the extracted characteristic point.

According to a third aspect of the present invention, there is provided a pattern measurement method comprising:

acquiring graphic data of a plurality of patterns including image data;

processing the graphic data to detect a coordinate of an edge point of the pattern;

combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and calculating a characteristic amount of the distance angle distribution map to evaluate at least one of a relation of shape between the patterns, a relation of size between the patterns, and a relative location between the patterns on the basis of the calculated characteristic amount.

According to a fourth aspect of the present invention, there is provided a manufacturing method of a semiconductor device using a pattern measurement method comprising:

acquiring graphic data of a plurality of patterns including image data;

processing the graphic data to detect a coordinate of an edge point of the pattern;

combining the edge points between the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points; and evaluating at least one of a relation of shape between the patterns, a relation of size between the patterns, and a relative location between the patterns on the basis of the prepared distance angle distribution map.

According to a fifth aspect of the present invention, there is provided a manufacturing method of a semiconductor device using a pattern measurement method comprising:

acquiring graphic data of a plurality of patterns including image data;

processing the graphic data to detect a coordinate of an edge point of the pattern;

combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and extracting a characteristic point of the distance angle distribution map to evaluate at least one of a relation of shape between the patterns, a relation of size between the patterns, and a relative location between the patterns on the basis of the extracted characteristic point.

According to a sixth aspect of the present invention, there is provided a manufacturing method of a semiconductor device using a pattern measurement method comprising:

acquiring graphic data of a plurality of patterns including image data;

processing the graphic data to detect a coordinate of an edge point of the pattern;

combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and calculating a characteristic amount of the distance angle distribution map to evaluate at least one of a relation of shape between the patterns, a relation of size between the patterns, and a relative location between the patterns on the basis of the calculated characteristic amount.

According to a seventh aspect of the present invention, there is provided a program which allows a computer to execute a pattern measurement method, the pattern measurement method comprising:

acquiring graphic data of a plurality of patterns including image data;

processing the graphic data to detect a coordinate of an edge point of the pattern;

combining the edge points between the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points; and evaluating at least one of a relation of shape between the patterns, a relation of size between the patterns, and a relative location between the patterns on the basis of the prepared distance angle distribution map.

According to an eighth aspect of the present invention, there is provided a program which allows a computer to execute a pattern measurement method, the pattern measurement method comprising:

acquiring graphic data of a plurality of patterns including image data;

processing the graphic data to detect a coordinate of an edge point of the pattern;

combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and extracting a characteristic point of the distance angle distribution map to evaluate at least one of a relation of shape between the patterns, a relation of size between the patterns, and a relative location between the patterns on the basis of the extracted characteristic point.

According to a ninth aspect of the present invention, there is provided a program which allows a computer to execute a pattern measurement method, the pattern measurement method comprising:

acquiring graphic data of a plurality of patterns including image data;

processing the graphic data to detect a coordinate of an edge point of the pattern;

combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and calculating a characteristic amount of the distance angle distribution map to evaluate at least one of a relation of shape between the patterns, a relation of size between the patterns, and a relative location between the patterns on the basis of the calculated characteristic amount.

According to a tenth aspect of the present invention, there is provided a pattern measurement apparatus comprising:

an edge point detector which receives graphic data of a plurality of patterns including image data and processes the graphic data to detect a coordinate of an edge point of the pattern;

a distance angle distribution map preparer which combines the edge points between the patterns to make a pair of edge points and calculates a distance between the edge points constituting each pair of edge points and an angle between a straight line to connect the edge point to the other edge point and an arbitrary axial line with respect to each pair of edge points to prepare a distribution map of the calculated distance and angle of the pair of edge points as a distance angle distribution map; and an evaluator which evaluates at least one of a relation of shape between the patterns, a relation of size between the patterns, and a relative location between the patterns on the basis of the prepared distance angle distribution map.

According to an eleventh aspect of the present invention, there is provided a pattern measurement apparatus comprising:

an edge point detector which receives graphic data of a plurality of patterns including image data and processes the graphic data to detect a coordinate of an edge point of the pattern;

a distance angle distribution map preparer which combines the edge points of the patterns to make a pair of edge points and calculates a distance between the edge points constituting each pair of edge points and an angle between a straight line to connect the edge point to the other edge point and an arbitrary axial line with respect to each pair of edge points to prepare a distribution map of the calculated distance and angle of the pair of edge points as a distance angle distribution map for each pattern; and an evaluator which extracts a characteristic point of the distance angle distribution map to evaluate at least one of a relation of shape between the patterns, a relation of size between the patterns, and a relative location between the patterns on the basis of the extracted characteristic point.

According to a twelfth aspect of the present invention, there is provided a pattern measurement apparatus comprising:

an edge point detector which receives graphic data of a plurality of patterns including image data and processes the graphic data to detect a coordinate of an edge point of the pattern;

a distance angle distribution map preparer which combines the edge points of the patterns to make a pair of edge points and calculates a distance between the edge points constituting each pair of edge points and an angle between a straight line to connect the edge point to the other edge point and an arbitrary axial line with respect to each pair of edge points to prepare a distribution map of the calculated distance and angle of the pair of edge points as a distance angle distribution map for each pattern; and an evaluator which calculates a characteristic amount of the distance angle distribution map to evaluate at least one of a relation of shape between the patterns, a relation of size between the patterns, and a relative location between the patterns on the basis of the calculated characteristic amount.

BRIEF DESCRIPTION OF THE DRAWINGS

FIG. 14 is a diagram showing a rectangular standard pattern registered beforehand as CAD data, and a circular pattern disposed in a middle inside the standard pattern;

FIG. 15 is a diagram showing the rectangular standard pattern registered beforehand as the CAD data, and a circular pattern disposed in a position deviating from the middle inside the standard pattern;

FIG. 16A is a DAD map obtained with respect to the rectangular pattern and circular pattern shown in FIG. 14, and FIG. 16B is a DAD map obtained with respect to the rectangular pattern and circular pattern shown in FIG. 15;

FIGS. 17A to 17H show a standard graphic, patterns obtained by converting the shape of the standard graphic, and DAD maps;

FIG. 23A shows one example of a standard image according to a design data, and FIGS. 23B to 23F are diagrams showing examples of specific patterns of a product manufactured on the basis of the design data;

DETAILED DESCRIPTION OF THE INVENTION

Some embodiments of the present invention will be described hereinafter with reference to the drawings. In the following embodiments, measurement of a fine pattern of a semiconductor will also be described, but the present invention is not limited to such measurement, but can variously be applied as a new technique for general pattern measurement to various industrial fields. In the following description, SEM image data supplied as image data of a pattern which is a measurement target from CDSEM will appropriately be described, but this is merely one example and, needless to say, the present invention can also be applied to the image data acquired from optical apparatuses such as a digital camera and scanner.

(A) One Embodiment of Pattern Measurement Apparatus

Figure 1:
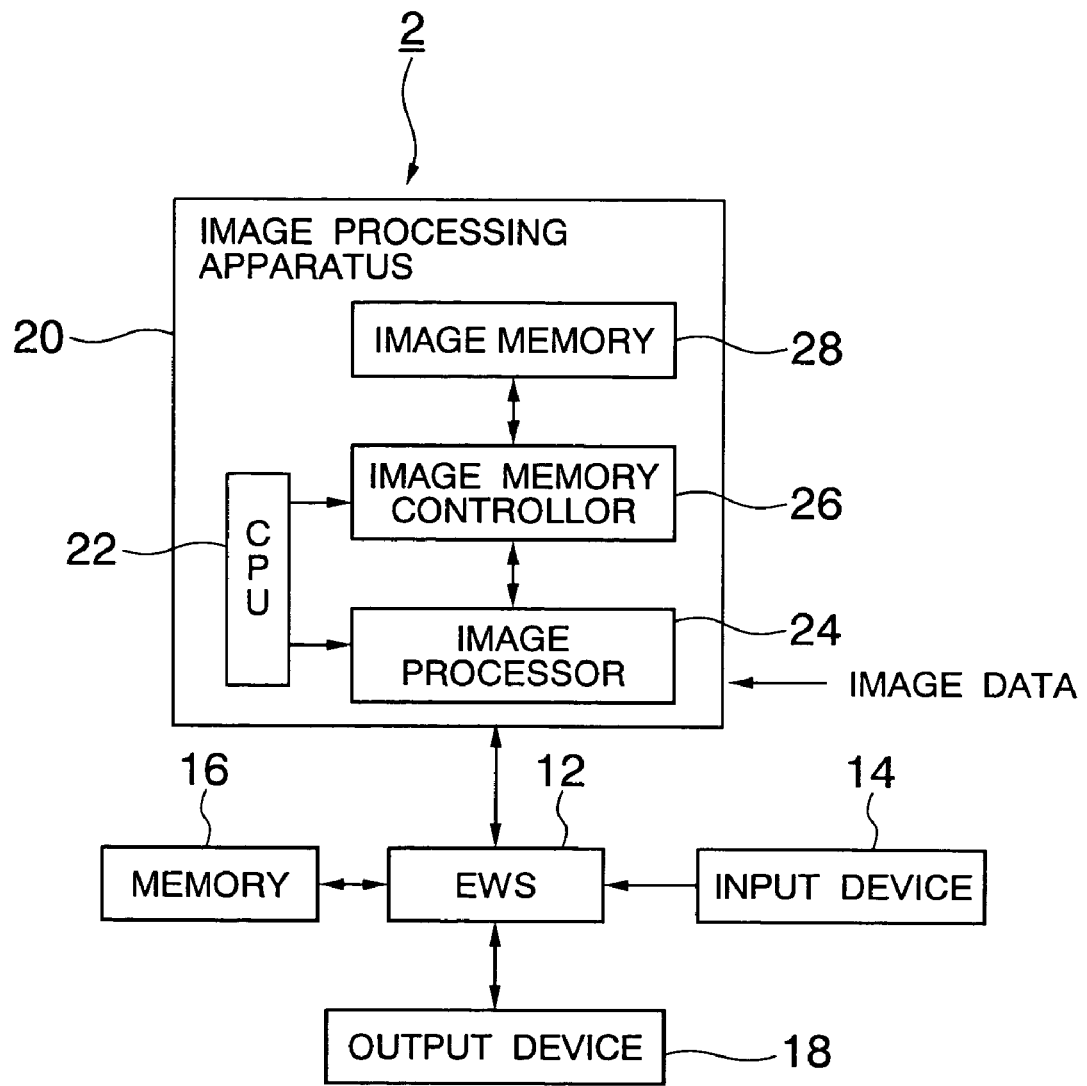
FIG. 1 is a block diagram showing one embodiment of a pattern measurement apparatus according to the present invention.

FIG. 1 is a block diagram showing one embodiment of a pattern measurement apparatus according to the present invention. A pattern measurement apparatus 2 shown in the figure comprises a workstation (EWS) 12, an image processing apparatus 20, a memory 16, an output device 18, and an input device 14.

In the memory 16, a recipe file in which algorithm of a pattern measurement method of the present invention is written is stored.

The workstation 12 reads a recipe file from the memory 16, controls the whole apparatus in accordance with the recipe file, extracts information such as a characteristic point or amount in accordance with a measurement purpose from a distance angle distribution map described later (hereinafter referred to as DAD map), and additionally executes various calculation processes described later. The workstation 12 sets a standard pattern which is a standard of evaluation of a measurement target pattern on the basis of the recipe file or operator's designation via the input device 14 described later. The output device 18 uses a display to display the DAD map supplied from the image processing apparatus 20 via the workstation 12 together with the characteristic point or amount extracted by the workstation 12. In the present embodiment, however, it is not necessary to display the DAD map and the like by the output device 18, and information thereof may only be stored in an image memory 28 of the image processing apparatus 20 as described later. The input device 14 is an inputting apparatus such as a keyboard and mouse.

The image processing apparatus 20 includes a CPU 22, an image processor 24, an image memory controller 26, and the image memory 28.

The image processor 24 receives image data supplied, for example, from CDSEM or optical apparatus (not shown) to carry out image processing described later, such as the preparation of the DAD map. The image memory 28 includes a plurality of storage regions, and stores the image data of a measurement target pattern or non-defective pattern constituting a standard image described later, CAD data constituting the standard image, graphic data of simulation results, and data of the DAD map in different storage regions under control of the image memory controller 26. The image memory controller 26 constitutes arrangement data on the basis of a disposed between edge points, and an angle of a straight line connecting an edge point to the other edge point in a pair of edge points with respect to an X-axis direction for each pair of edge points described later, and further adds a memory address to the data of each DAD map.

An operation of the pattern measurement apparatus 2 shown in FIG. 1 will be described as embodiments of a pattern measurement method according to the present invention with reference to the drawings.

(B) Embodiment of Pattern Measurement Method (1) First Embodiment

Figure 2:
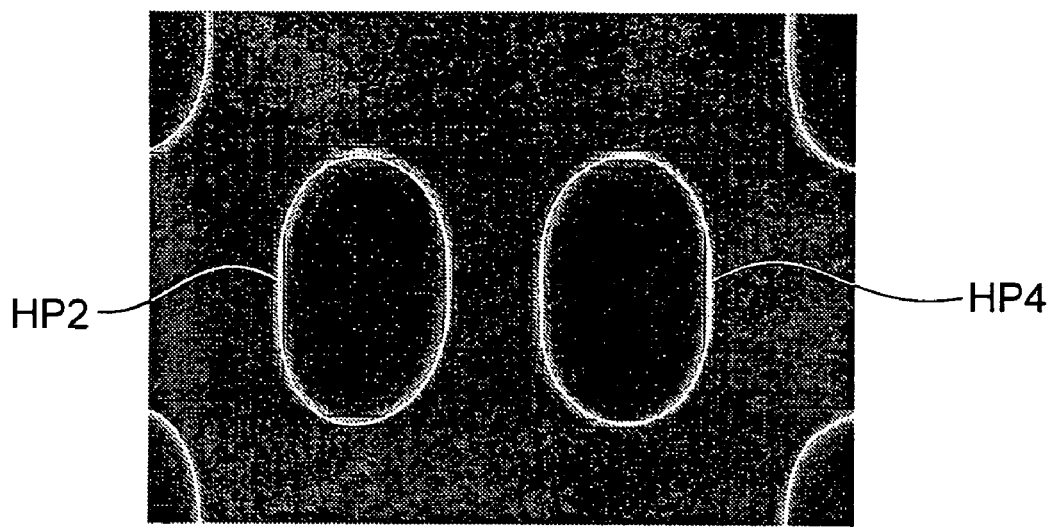
FIG. 2 is a diagram showing an image acquired with respect to one example of two hole patterns disposed adjacent to each other.

A first embodiment of the pattern measurement method according to the present invention will be described using an example in which two hole patterns disposed adjacent to each other shown in FIG. 2 are to be measured.

First, the image data of hole patterns HP2, HP4 shown in FIG. 2 is supplied to the image processor 24 of the pattern measurement apparatus 2. Next, either hole pattern is selected as standard pattern on the basis of setting in the recipe file via the workstation 12. In the present embodiment, for example, the hole pattern HP2 on the left side in the drawing is determined as a standard pattern, and the hole pattern HP4 on the right side in the drawing sheet is determined as a measurement target pattern. It is to be noted that any pattern may also be selected as the standard pattern and, for example, the hole pattern HP4 may also be selected as the standard pattern. In setting of the standard pattern an operator may select a pattern after it is displayed by the output device 18, and the operator may input the pattern via the input device 14, so that the workstation 12 sets the pattern as the standard pattern on the basis of the input. This respect also applies to embodiments described later. Furthermore, it is to be noted that the present embodiment does not originally require any selection of the standard pattern.

Next, the image processing apparatus 20 detects coordinates of the edge points constituting contour lines with respect to each pattern, takes all combinations of the edge points between the hole patterns HP2, HP4, calculates a distance between the edge points of the hole patterns HP2, HP4 in each combination, and an angle of the straight line connecting one edge point to the other edge point with respect to an arbitrary axial line such as an X-axis, prepares the distance angle distribution map (hereinafter referred to as the DAD map), stores the map in the image memory 28 via the image memory controller 26, and further supplies the map to the workstation 12. For a detailed method for preparing the DAD map, refer to Japanese Patent Laid Open (kokai) No. 2002-288677.

Figure 3:
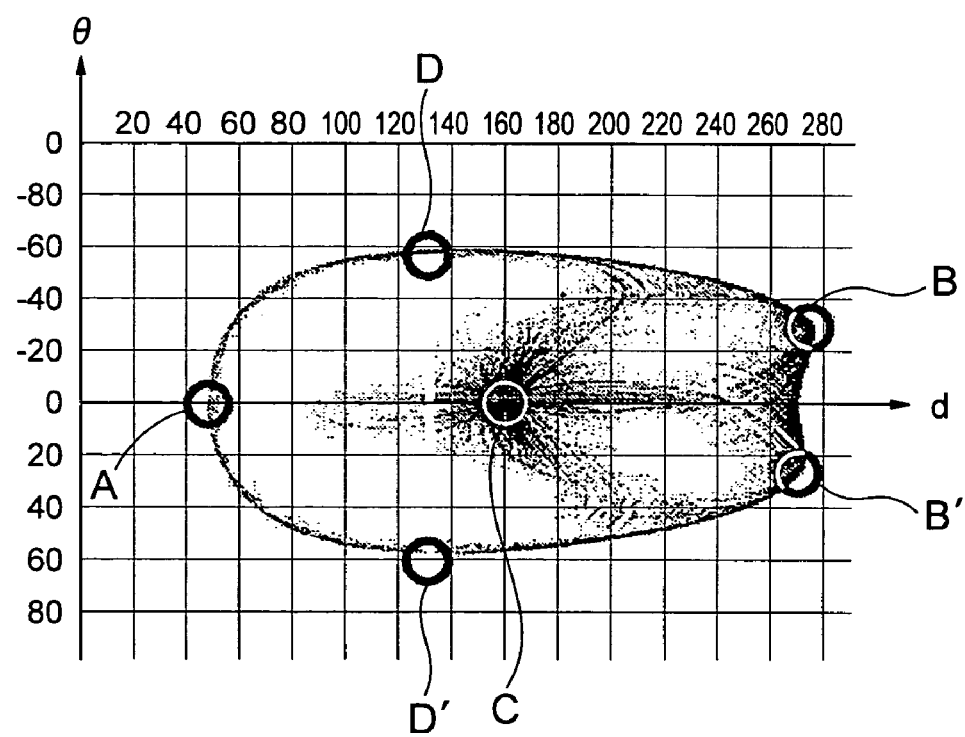
FIG. 3 is a DAD map prepared with respect to two hole patterns shown in FIG. 2.

The DAD map prepared with respect to the hole patterns HP2, HP4 shown in FIG. 2 is shown in FIG. 3. FIG. 3 shows the DAD map in a mode shown on a display (not shown) by the output device 18 of the workstation 12. However, in practical use, it is not necessary show the DAD map to those who measure the pattern. The data of the DAD map is sent to and developed in the image memory 28 of the image processing apparatus 20 by the image memory controller 26 as described above.

Next, the workstation 12 extracts the characteristic point from the prepared DAD map, and analyzes and outputs indexes showing a relative location between two hole patterns HP2, HP4 and a difference in the shape between these hole patterns from this characteristic point. In the present embodiment, as shown in FIG. 3, points A, B1, B2, C, D1, and D2 are extracted as the characteristic points. For the characteristic point A, a distance component (hereinafter referred to simply as "d component") thereof indicates the minimum value in the points (pair of edge points) distributed in the DAD map. The characteristic points B1, B2 include the d components indicating the maximum value in the DAD map. The characteristic point C is the maximum intensity point in the DAD map, and the characteristic points D1, D2 include angle components (hereinafter referred to simply as "θ component") whose absolute value indicates the maximum value in regions of θ>0 and θ<0 in the DAD map, respectively.

Figure 4:
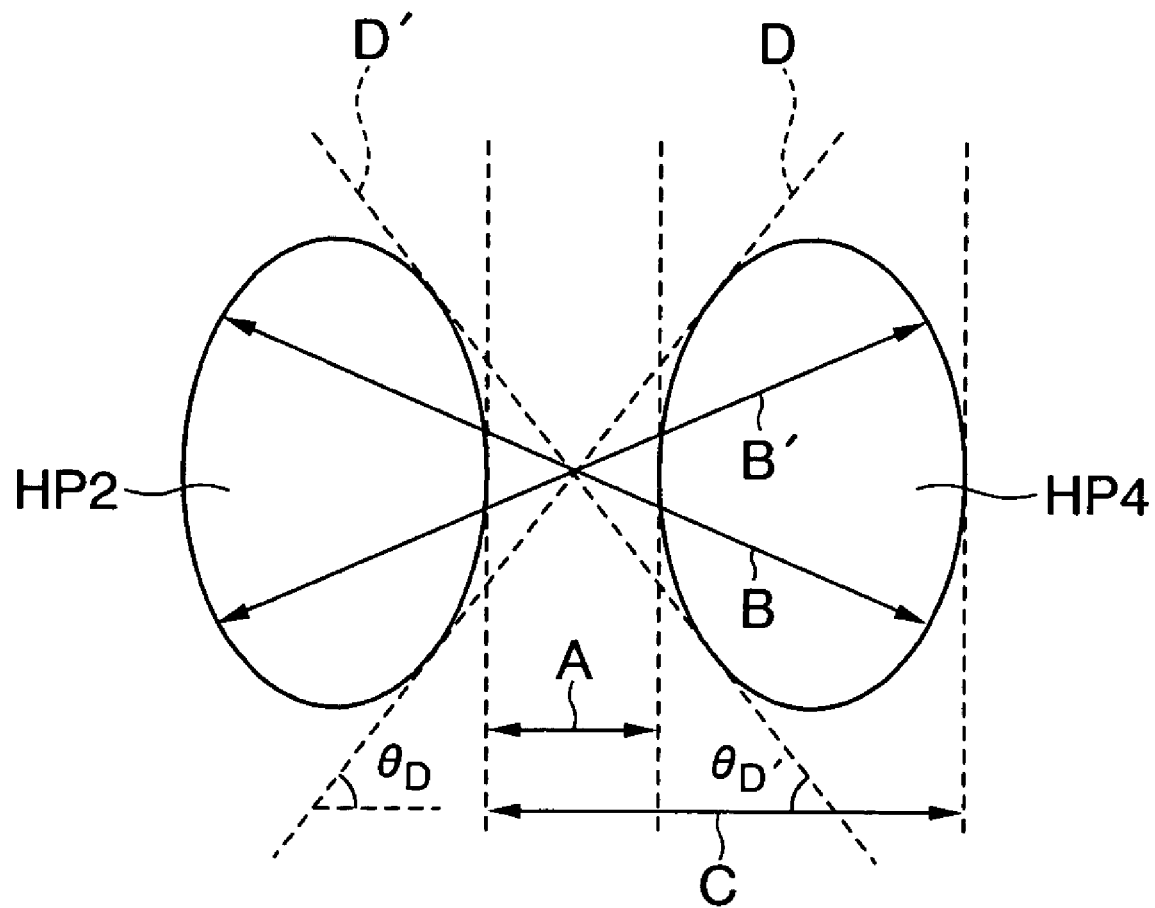
FIG. 4 is an explanatory view showing a relation between a characteristic point extracted from the DAD map shown in FIG. 3 and an actual pattern.

FIG. 4 is an explanatory view showing a relation between the characteristic points A, B1, B2, C, D1, D2 and an actual pattern. As shown in the figure, the d component of the characteristic point A corresponds to the minimum distance between two hole patterns in the actual patterns. The d components of the characteristic points B1, B2 correspond to the maximum distance and a distance near to the maximum distance between two hole patterns, respectively, and these distances constitute indexes to represent a difference in the shape between two hole patterns. The d component of the characteristic point C on the DAD map corresponds to a relative location of the measurement target pattern HP4 with respect to the standard pattern HP2, that is, a pitch. Furthermore, when a counterclockwise direction is assumed as a positive direction, θ components θD1, θD2 of characteristic points D1, D2 on the DAD map correspond to angles formed by two tangent lines common to the two hole patterns with respect to the X-axis.

The workstation 12 calculates the minimum distance between the two hole patterns HP2, HP4, and an intersecting angle of the two tangent lines common to the two hole patterns on the basis of these characteristic points A, B1, B2, C, D1, D2, outputs the index representing the relative location between the two hole patterns, further calculates the maximum distance between the two hole patterns HP2, HP4 and the distance near thereto, and outputs the indexes representing the difference in the shape between the hole patterns.

In this manner, according to the pattern measurement method of the present embodiment, the indexes representing the relative location between two patterns and the difference in the shape between the patterns can easily, precisely, and quantitatively be measured. Especially, it has heretofore been very difficult to measure the pitch of the hole pattern among these indexes, but according to the pattern measurement method of the present embodiment, the pitch can easily and precisely be measured. Furthermore, when a line along a designed direction in arranging two hole patterns is set, for example, as the above-described arbitrary axial line, it can be judged whether or not two hole patterns are arranged in the direction as designed. When the patterns are not arranged in the designed direction, the direction in which the patterns are shifted from the designed direction can also strictly be calculated from the θ component of the characteristic point C on the DAD map or the θ components θD1, θD2 of the characteristic points D1, D2 on the DAD map. The measurement of the intersecting angle of the tangent lines common to two hole patterns has been very laborious measurement in a conventional method, but according to the present embodiment, the angle can also be measured with remarkable easy and high accuracy.

In this manner, according to the present embodiment, it is possible to quickly, highly precisely measure the shape difference between two patterns and a positional deviation amount from a desired relative location at a low cost, which has heretofore required such a long measurement time that measurement cost has been high and that a burden on CPU has also been large.

(2) Second Embodiment

In the following second through seventh embodiments, the term "pattern shape" is defined to include the size and shape of the pattern.

In the first embodiment, a case where there is not any difference in the size between the left and right pattern shapes has been described, but in the present embodiment, a case in which there is a large difference between adjacent left and right pattern shapes will be described.

Figure 5:
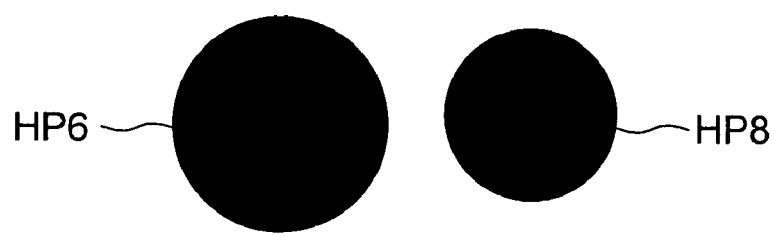
FIG. 5 is a diagram showing an image acquired with respect to two hole patterns which have a different size in pattern shapes.

For two hole patterns HP6 and HP8 shown in FIG. 5, when the hole pattern HP8 on the right side in the drawing is assumed as a standard graphic, the measurement target pattern HP6 on the left side in the drawing is larger than the standard graphic HP8. In the present embodiment, in order to facilitate the understanding, two hole patterns HP6 and HP8 are all assumed as patterns of a perfect circle, and the patterns analogous to each other will be described. However, as described later in the third embodiment, even when the shape changes in addition to the size, the similar result is obtained.

Figure 6:
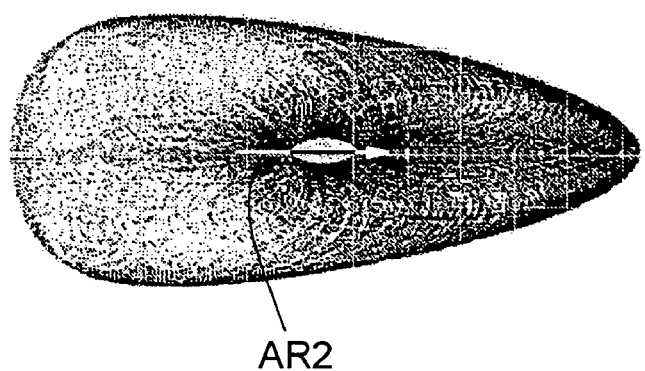
FIG. 6 shows a DAD map prepared with respect to two hole patterns shown in FIG. 5.
Figure 7:
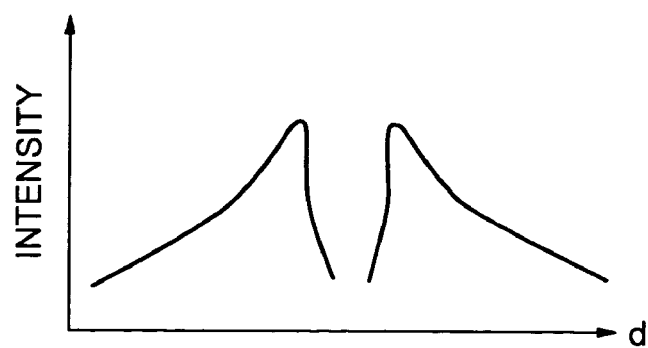
FIG. 7 is a diagram showing an intensity distribution along an arrow in FIG. 6.

The image processor 24 of the pattern measurement apparatus 2 receives the supply of the images of two hole patterns HP6 and HP8, and prepares the DAD map between the hole patterns HP6 and HP8. The DAD map obtained by a procedure similar to that of the first embodiment with respect to the hole patterns HP6 and HP8 shown in FIG. 5 is shown in FIG. 6. Here, it is noted that a hole is made in a middle portion in the DAD map shown in FIG. 6. This is caused by a difference in the size between the hole patterns HP6 and HP8. An intensity distribution along an arrow AR2 of FIG. 6 is shown in FIG. 7. In the present embodiment, an ideal perfect circle has been described, and therefore a diameter of a hole of the distribution in a d-axis direction is equal to a difference between the diameters of the hole patterns HP6 and HP8.

Figure 8:
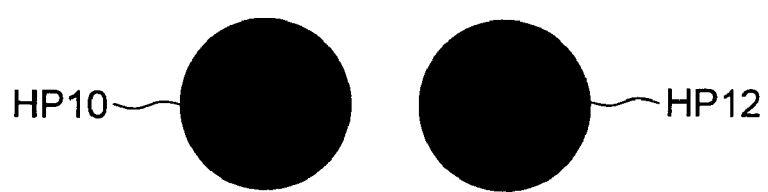
FIG. 8 is a diagram showing images acquired with respect to two hole patterns which have the same shape.
Figure 9:
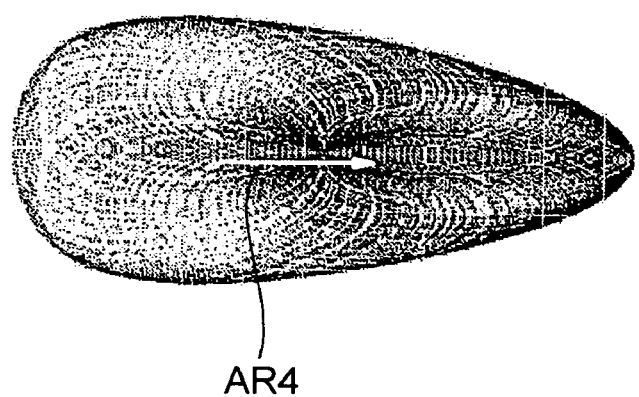
FIG. 9 is a DAD map prepared with respect to two hole patterns shown in FIG. 8.
Figure 10:
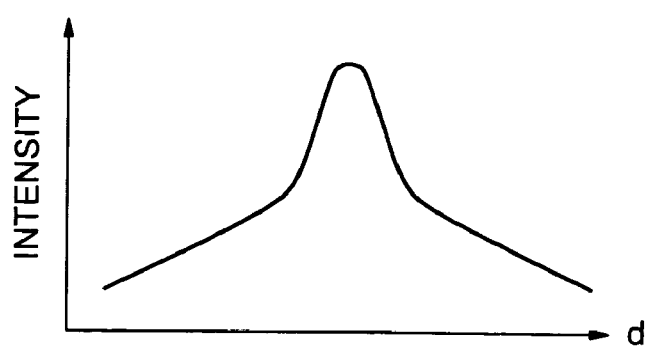
FIG. 10 is a diagram showing the intensity distribution along an arrow in FIG. 9.

As a reference example, a case in which the left and right hole patterns have the same shape is shown in FIG. 8. FIG. 9 shows a DAD map prepared with respect to hole patterns HP10, HP12, and FIG. 10 shows the intensity distribution along an arrow AR4 of FIG. 9. For the DAD map of the hole patterns HP10, HP12, as shown in FIG. 10, the distributed intensity is maximized in the middle, and the maximum value which is also a largest value corresponds to the size of the pitch (d component) and the direction of the pitch (θ component) between the hole patterns HP10, HP12 as described above in the first embodiment.

In this manner, according to the present embodiment, it is possible to quickly and easily acquire an amount representing the difference in the size between two hole patterns.

In the present embodiment, a method of regarding two hole patterns as separate patterns, assuming either one of the patterns as the standard pattern, and assuming the other pattern as the measurement target pattern to evaluate the shape of the pattern has been described. In another mode, however, two left and right hole patterns may be regarded as a single pattern to evaluate left/right symmetry.

(3) Third Embodiment

For the present embodiment, the second embodiment is expanded so as to be applicable to a more realistic measurement target pattern.

Figure 11:
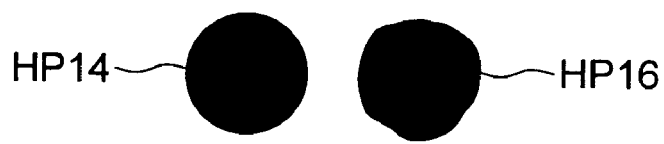
FIG. 11 is a diagram showing an image acquired with respect to a standard pattern of a perfect circle and a circular pattern having a distorted shape.

FIG. 11 shows an image acquired with respect to a perfect circle pattern HP14 and a circular pattern HP16 distorted at random. Here, the circular pattern HP16 is, for example, a measurement target pattern actually manufactured as a product, and the perfect circle pattern HP14 is, for example, a pattern of a non-defective, and is a pattern set as the standard pattern by the workstation 12.

Figure 12:
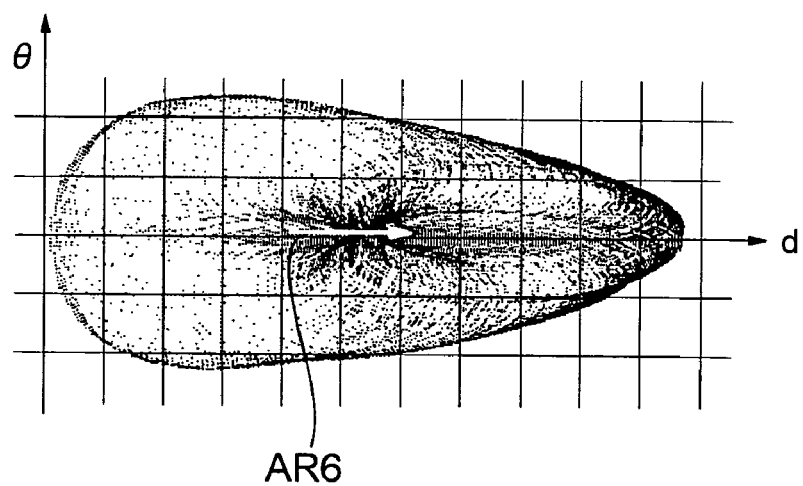
FIG. 12 is a DAD map prepared with respect to two hole patterns shown in FIG. 11.
Figure 13:
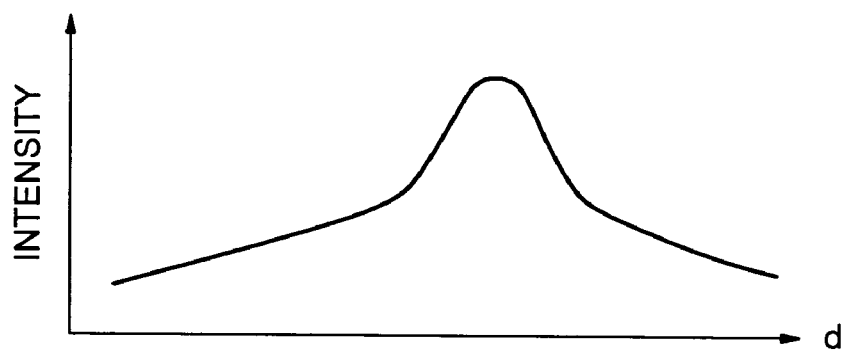
FIG. 13 is a diagram showing the intensity distribution along an arrow in FIG. 12.

The DAD map of the patterns HP14, HP16 prepared by the image processor 24 is shown in FIG. 12. As shown in the figure, when the pairs of edge points include the edge points of the randomly distorted circular patterns, the boundary of the distribution is asymmetric with respect to a d-axis. From this, it can be judged that there is a difference in the shape between two hole patterns. FIG. 13 is an intensity distribution diagram along an arrow AR6 in FIG. 12. Also in contrast with FIG. 10, the intensity distribution in the vicinity of the maximum point in FIG. 13 is dull. It is seen that the distortion of the measurement target pattern HP16 appears in this point. The workstation 12 calculates, for example, the length of the distribution boundary of the DAD map and the area within the distribution boundary, and outputs numeric values as quantitative shape indexes of the measurement target pattern HP16. More specifically, as a quantitative measured amount representing a shape, for example, a half-value width of the maximum point of FIG. 13 can be defined.

(4) Fourth Embodiment

In the first and second embodiments, a case in which the same image includes the standard graphic as well as the measurement target pattern is described. In the present embodiment, different from this case, a case in which the standard graphic is stored as another data beforehand in the memory 16 will be described.

FIGS. 14 and 15 show a circular pattern HP18 which is a measurement target, and a rectangular standard pattern RP2 stored as CAD data in the memory 16 beforehand. For example, in a manufacturing field of a semiconductor device, the pattern RP2 as the CAD data may be either a pattern formed on the same layer as that of the measurement target pattern or a pattern formed on a different layer. When a pattern is formed on the different layer, for example, on a lower layer of an invisible layer or on an upper layer to be processed, the image of the pattern cannot be acquired, for example, even with the use of an electron beam. Therefore, it is difficult to align the pattern of the CAD data with the measurement target pattern. In the present embodiment, it is assumed that a pattern represented by the CAD data can be aligned with a characteristic visible pattern whose image can be acquired at a low-magnification, that is, in a broader range in a previous stage of the measurement.

FIG. 14 shows that the circular pattern HP18 is disposed in a middle of the rectangular pattern RP2 and FIG. 15 shows that the circular pattern HP18 is disposed in a position deviating from the middle inside the rectangular pattern RP2. FIG. 16A and FIG. 16B show DAD maps obtained by pairing the edge points between the rectangular pattern RP2 and the circular pattern HP18. These DAD maps are prepared by the processing of the CAD data of the rectangular pattern RP2 supplied from the memory 16 via the workstation 12 and by the processing of the image data of the circular pattern HP18 supplied from the image memory 28 via the image memory controller 26 by the image processor 24. FIG. 16A shows the DAD map obtained between the rectangular pattern RP2 and circular pattern HP18 shown in FIG. 14, and FIG. 16B shows the DAD map obtained between the rectangular pattern RP2 and circular pattern HP18 shown in FIG. 15. A relative positional deviation of the circular pattern HP18 from the CAD data pattern can be detected from the difference between the DAD maps. For example, the d components of characteristic points E and F in FIG. 16B correspond to a distance (E of FIG. 15) between the circular pattern HP18 and the inner periphery of the CAD data pattern RP2 in the Y-axis direction, and a distance (F of FIG. 15) of therebetween in the X-axis direction. The workstation 12 defines and outputs the d components of the characteristic points E and F as the indexes of the shape of the measurement target pattern, representing the distance between the measurement target pattern and the CAD data pattern.

(5) Fifth Embodiment

In the above-described embodiments, edge points are paired between a plurality of patterns, especially between the standard graphic and the measurement target pattern to prepare the DAD map. However, in the present embodiment, a pattern measurement method will be described in which the DAD maps are separately prepared with the standard graphic and measurement target pattern, and the characteristic points/amounts are compared with each other among a plurality of prepared DAD maps.

FIGS. 17A to 17H show the standard graphic, patterns obtained by modifying the shape of the standard graphic, and the DAD maps. FIG. 17A shows a rectangular pattern SP2 which is the standard graphic, FIG. 17B shows a measurement target pattern SP4 obtained by tilting the rectangular pattern SP2 on the right side by 20°, FIG. 17C shows a measurement target pattern SP6 whose width is expanded by 10% of that of the rectangular pattern SP2, and FIG. 17D shows a measurement target pattern SP8 obtained by shifting the rectangular pattern SP2 upwards on the right side by 10%. FIGS. 17E through 17H are the DAD maps prepared by the image processor 24 of the image processing apparatus 20 with respect to the respective patterns shown in FIGS. 17A through 17D.

In the present embodiment, the workstation 12 extracts the maximum value of the d-axis direction in each DAD map as the characteristic point. These maximum values correspond to the length and angle of two diagonal lines intersecting with each other in the respective patterns shown in FIGS. 17A through 17D. For example, the d components of two maximum values indicated by circular frames G and H in the DAD map shown in FIG. E represent the length of each diagonal line of the standard graphic SP2, and the θ components thereof represent the angles of the respective diagonal lines of the standard graphic SP2 with respect to the X-axis direction, assuming that axial lines of the respective patterns SP2 to SP8 are X-axes shown in FIGS. 17A through 17D. Therefore, the workstation 12 obtains coordinates (d component, θ component) of the two maximum points from the DAD map of the standard graphic SP2. Next, the coordinates of the two maximum points corresponding to these maximum points are obtained in the DAD map of the measurement target pattern, and coordinate components of the maximum points are compared with each other, so that the distortion of the pattern or the difference from the standard graphic can be detected.

Advantages of the pattern measurement method of the present embodiment will be described in comparison with a method of direct measurement by a related art. According to the related art, especially when the measurement target pattern is an orderly pattern shown in the present embodiment, for example, vertexes of a quadrangle distorted by an arbitrary angle are recognized, and the lengths and angles of the diagonal lines have to be calculated by these positional coordinates. According to the present embodiment, when the coordinate of the maximum point of the d-axis direction on the DAD map is acquired, the lengths and angles of the diagonal lines can be obtained in a very short calculation time without executing the conventional intricate processing, and then a burden onto the CPU 22 can further be lightened.

Furthermore, according to the pattern measurement method of the present embodiment, even when the measurement target pattern is disposed in any position in the acquired image, the same DAD map is necessarily obtained with the same pattern. That is, in the measurement of the shape, information on parallel movement of the pattern is discarded. For example, in the manufacturing field of the semiconductor, when the pattern formed by an exposure apparatus is measured by CDSEM, a fluctuation is sometimes generated in the position of the pattern in the acquired image due to a limit of positioning precision of a detection apparatus. The pattern measurement method of the present embodiment is not influenced by this fluctuation. Furthermore, even when the target of the measurement is not a still image but a dynamic image, or the target is a pattern freely moving in parallel in the screen while changing the shape, it is possible to momentarily measure the shape of the target pattern all without distinction from the still image, as long as the DAD map can be prepared in one frame of the dynamic image.

(6) Sixth Embodiment

Characteristics of the present embodiment lie in that an area of the DAD map is used as a characteristic amount representing the relative location between the standard graphic and the measurement target pattern and the difference in shape therebetween. In general, in a field of a digital image processing technique, the area is defined as the total number of pixels in a target region. However, in the present embodiment, instead of the total number of pixels, the number of distributed dots existing in the region, or the number of pairs of edge points in which weight by frequency is added to the distributed dots may also be used.

Figure 18:
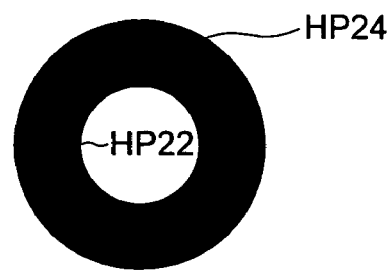
FIG. 18 is a diagram showing examples of two circular patterns which have diameters different from each other and which are arranged so as to form concentric circles.
Figure 19:
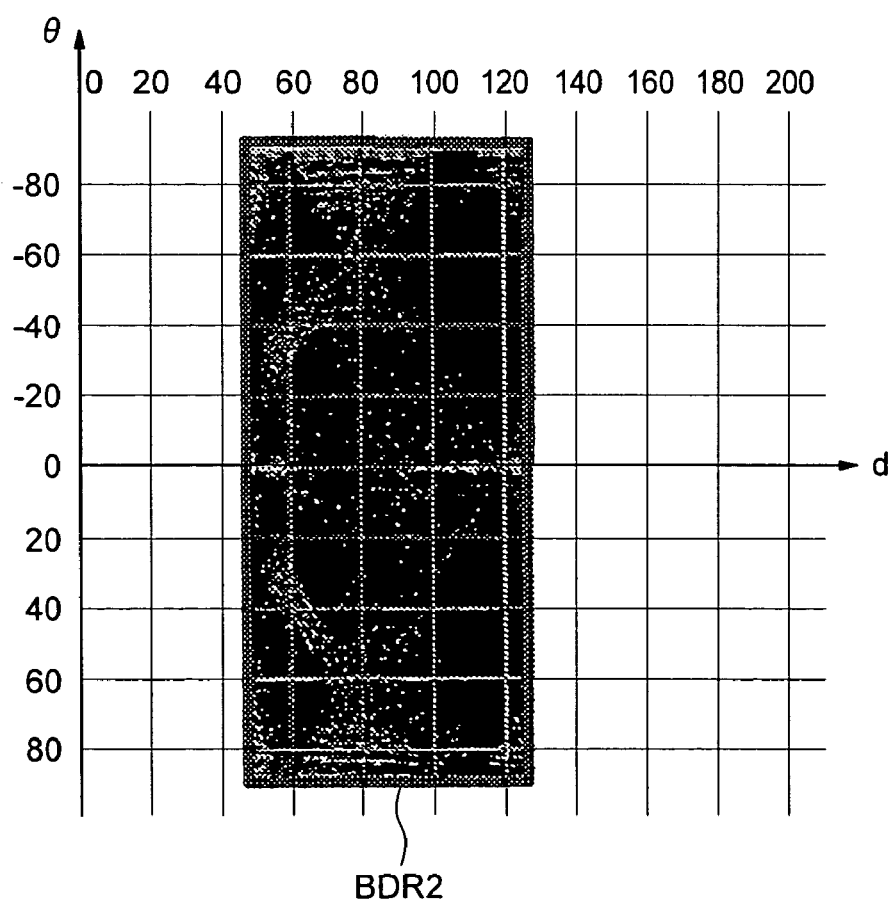
FIG. 19 is a DAD map prepared by pairs of edge points paired between the circular patterns shown in FIG. 18.

FIG. 18 shows two circular patterns HP22 and HP24 which have diameters different from each other and which are arranged so as to form concentric circles. FIG. 19 shows a DAD map prepared by the pairs of edge points paired between the circular patterns by the image processor 24. A code BDR2 in FIG. 19 indicates a boundary line of the distribution in the DAD map, and a rectangular region surrounded with the boundary line BDR2 is equivalent to one set of patterns shown in FIG. 18.

Figure 20:
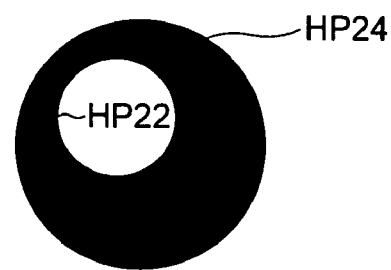
FIG. 20 is a diagram showing examples of two circular patterns which have diameters different from each other and which are arranged so as to prevent centers from agreeing with each other.
Figure 21:
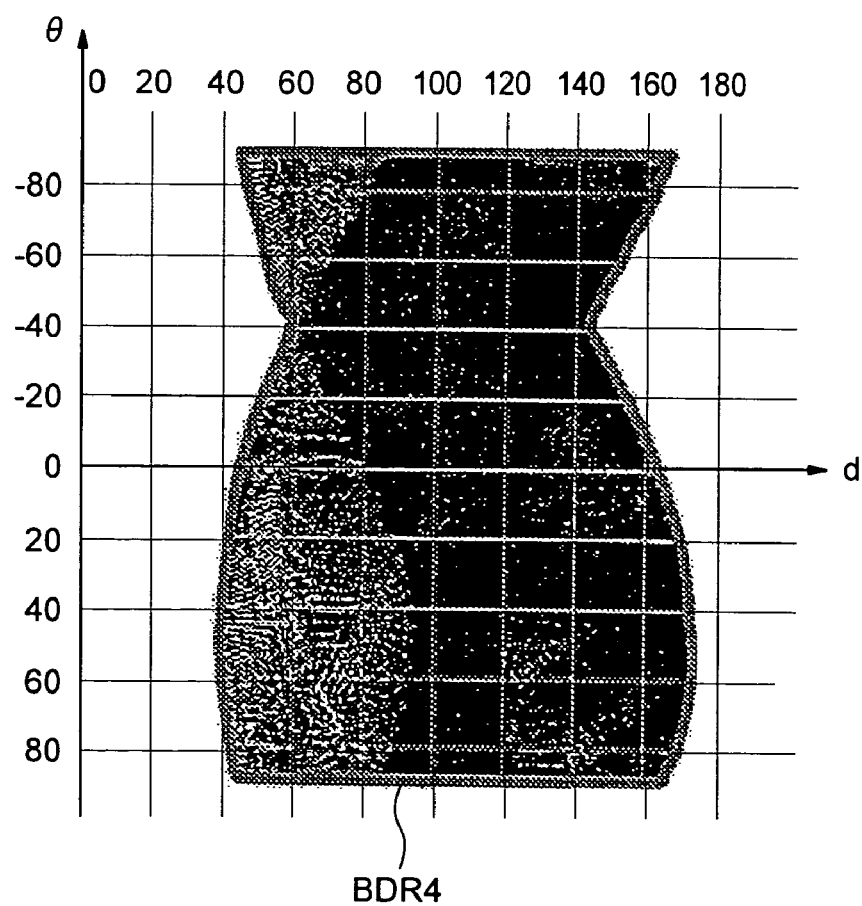
FIG. 21 is a DAD map prepared by the pairs of edge points paired between the circular patterns shown in FIG. 20.
Figure 22:
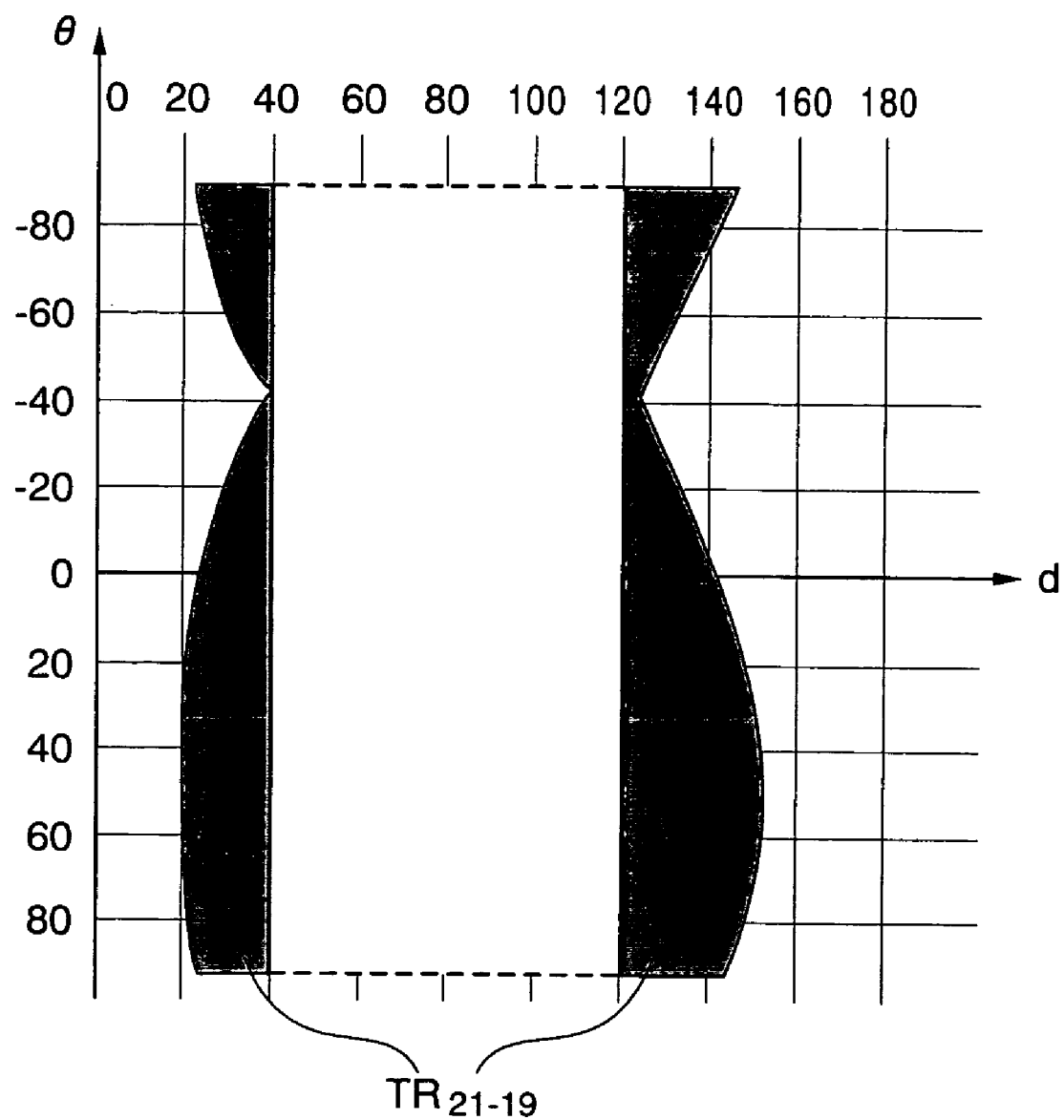
FIG. 22 is a diagram showing a region of a remaining part obtained by subtracting a region in a distribution boundary of FIG. 19 from that in the distribution boundary of FIG. 21.
Figure 24C:
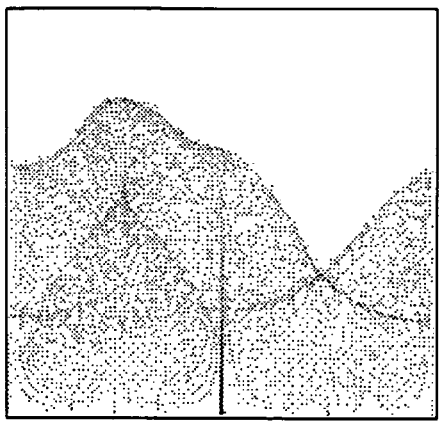
FIGS. 24A to 24F are DAD maps of the patterns shown in FIGS. 23A to 23F, respectively.
Figure 24F:
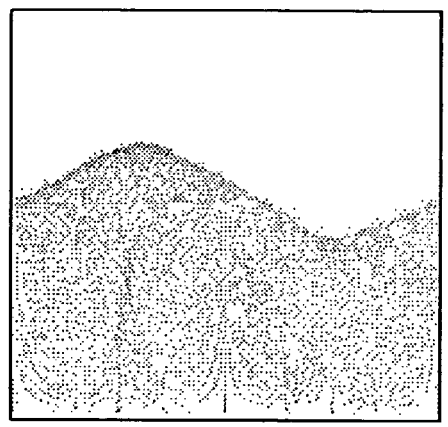
Figure 24B:
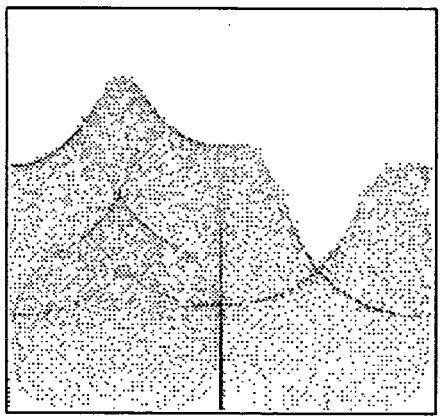
Figure 24E:
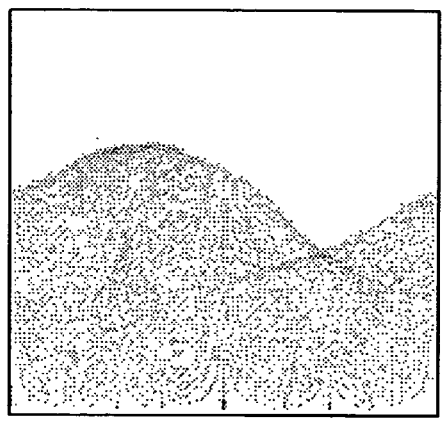
Figure 24A:
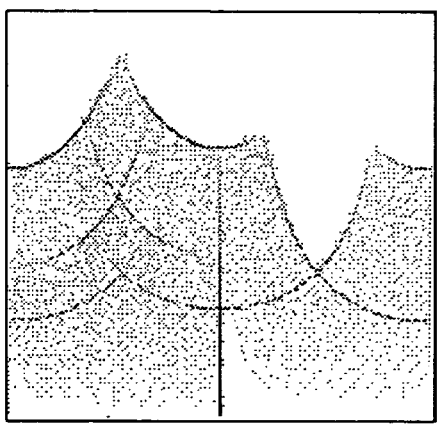
Figure 24D:
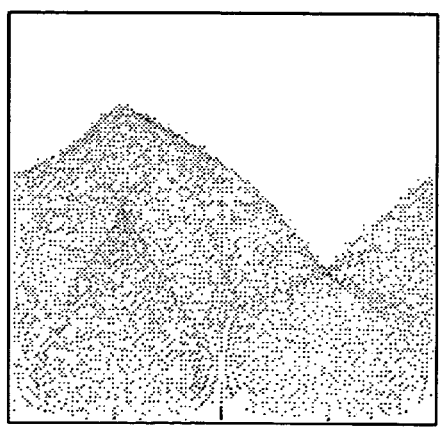
Figure 25:
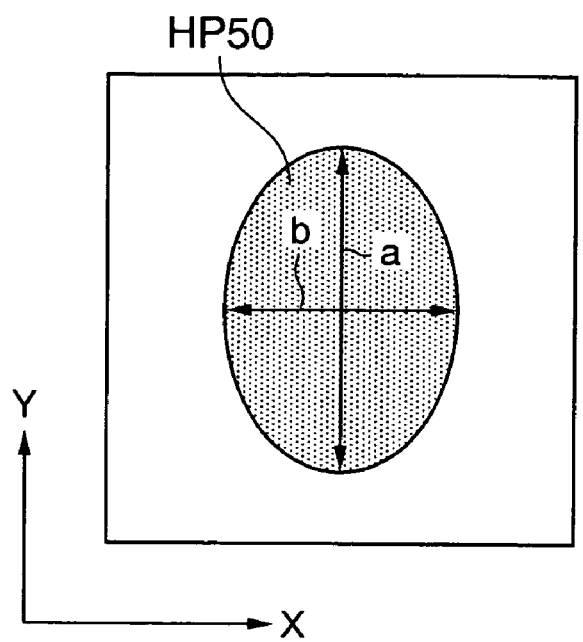
FIG. 25 shows one example of an elliptic pattern which is a target of pattern measurement.
Figure 26:
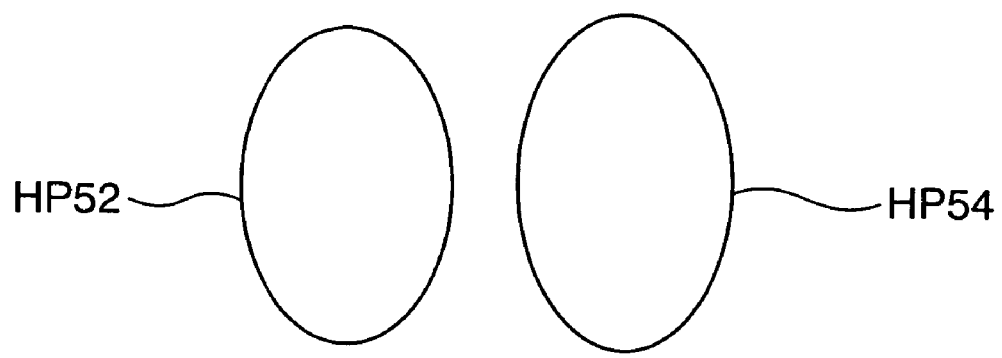
FIG. 26 shows another example of the elliptic pattern as another target of the pattern measurement.

FIG. 20 shows that the center of the circular pattern HP22 in the patterns shown in FIG. 18 deviates and one set of patterns are arranged so that the center does not agree with that of the outer circular pattern HP24. The DAD map prepared with respect to one set of patterns shown in FIG. 20 is shown in FIG. 21. Here, when the region surrounded with BDR2 of FIG. 19 is subtracted from a region surrounded with a boundary line BDR4 of the distribution in FIG. 21, a region TR21-19 shown in FIG. 22 remains. Such process for obtaining the difference between the regions is possible, more specifically, by the image processor 24 giving all the pixels in the distribution region of each DAD map 1 to execute binarizing of the image, and by the workstation 12 executes an image subtraction process between two binarized images. The area of the region TR21-19 shown in FIG. 22 represents the difference between the patterns of FIGS. 18 and 20. When the area of the region TR21-19 of FIG. 22 is calculated, one set of pattern shapes of FIG. 20 can be evaluated on the basis of one set of patterns of FIG. 18. When the area of the remaining region as a result of the subtraction is 0, two sets of patterns agree with each other. In the present embodiment, since the distribution region of FIG. 19 is included in that of FIG. 21, all the differences indicate positive values. However, when negative values (−) are produced depending on the result of the obtaining of the difference between the regions, the absolute value may also be obtained. Moreover, two values of the areas (pixels) having the positive and negative values may separately be outputted or displayed.

(7) Seventh Embodiment

Characteristics of the pattern measurement method of the present embodiment lie in that two or more patterns are mutually compared to evaluate similarity between the patterns. Examples of a plurality of patterns which are targets of the evaluation are shown in FIGS. 23A through 23F. FIG. 23A shows a standard graphic OP by design data, and FIGS. 23B through 23F show patterns TP2 through TP12 of a product manufactured on the basis of the design data, respectively. It is to be noted that here the "product" includes the semiconductor device, but is not limited to the device, and it should be understood that the term "product" represents general products.

FIGS. 24A through 24F show DAD maps prepared with respect to the patterns shown in FIGS. 23A through 23F, respectively, by the image processor 24. The workstation 12 calculates a two-dimensional correlation value between the DAD maps to evaluate the similarity between the original patterns. The two-dimensional correlation value of FIGS. 24B to 24F is defined as to R on the basis of the DAD map of FIG. 24A and the calculated values R are also shown in the respective patterns of FIGS. 23A through 23F. As apparent from the comparison between the respective patterns together with the respective two-dimensional correlation values R in FIGS. 23A through 23F, it is found that to more extent the shape of the product becomes distorted from the design data, the smaller the value of R becomes than 1. Here, to monitor the distortion from the design data, for example, R=0.7 is selected as a threshold value and is beforehand stored in the recipe file in the memory 16. The workstation 12 judges that the product having a value not more than the threshold value is a defective. Accordingly, it is possible to easily and quickly inspect the shape of the product. In the examples shown in FIGS. 23A through 23F, it can be judged that, needless to say, the product manufactured according to the design data of FIG. 23A is a non-defective, patterns TP2, TP4 shown in FIGS. 23B and 23C are non-defectives and patterns TP8, TP10, TP12 shown in FIGS. 23D through 23F are defectives, respectively. In the present embodiment, the shape of the measurement target itself cannot be figured out in detail, but it is possible to quantitatively evaluate a degree of distortion from a designed pattern in the pattern shape of the product at high speed.

Moreover, it is possible to quantitatively evaluate performance of the simulation itself by setting the result of the simulation as the standard graphic and by quantitatively evaluating the distortion of the product with respect to the simulation result on the contrary to setting the design data as the standard graphic and quantitatively evaluating the distortion of the product with respect to the design data.

In calculating a correlation value between the DAD maps, a standardization process of the DAD map may be executed by, for example, the image processor 24. More specifically, the total number of dots indicating the pairs of edge points in the DAD map is set, for example, as 1000 dots, the DAD map constantly constituted of the certain number of pairs of edge points can be prepared by removing the dots over the set number by, for example, thinning the dots at random when the number of dots constituting the pair of edge points in the DAD map exceeds the set number. Usually, the DAD map is formed by the points constituting the pairs of edge points exceeding 1000 dots. When the number of dots is not more than 1000 points, the workstation 12 may also notify that the standardization fails to those who measure the patterns via the output device 18, for example, using an alarm message or the like. In this case, those who measure the patterns may lower the threshold value to execute the standardization process again. This procedure may also be incorporated in the recipe file beforehand, included in the image processing, and automatically executed. Furthermore, the dots may also be thinned according to a certain rule, not at random. For example, it is also possible to thin the dots in order from low-density points. With the standardization according to this rule, the intensity distribution of the DAD map can further be emphasized.

Needless to say, it is also possible to directly calculate two-dimensional correlation with the rear image without using any DAD map, but this might cause the value impractical because the value largely depends on the position of the pattern. According to the present embodiment, by the pattern measurement method using the DAD map, the correlation value between the patterns can be calculated without depending on the location of the pattern in the image.

(C) Manufacturing Method of Semiconductor Device

When the above-described pattern measurement method is used in manufacturing the semiconductor device, the shape of the semiconductor fine pattern can quantitatively be evaluated and measured at high speed and with high accuracy. Therefore, a turn around time (TAT) can be reduced, and yield of the product can further be enhanced.

(D) Program and Recording Medium

A series of procedure of the above-described pattern measurement method may also be incorporated in a program, read by a computer capable of processing the image data, and executed. Accordingly, the pattern measurement method according to the present invention can be realized using a general-purpose computer. Program for allowing the computer to execute the series of procedure of the pattern measurement method may also be stored in recording mediums such as a flexible disk and CD-ROM, and read and executed by the computer. Accordingly, the pattern measurement method according to the present invention can be realized using the general-purpose computer. The recording mediums are not limited to portable mediums such as a magnetic disk and optical disk, and a fixed type of recording mediums such as a hard disk drive and memory may also be used. The program in which the series of procedure of the pattern measurement method is incorporated may also be distributed via a communication circuit such as internet (including radio communication). Furthermore, the program in which the series of procedure of the pattern measurement method is incorporated may also be enciphered, modulated, or compressed, contained in the recording mediums, and distributed in this state via cable circuits such as the internet or radio circuits.

What is claimed is:

1. A pattern measurement method comprising:
   acquiring graphic data of a plurality of patterns including image data, the plurality of patterns including a measurement target pattern and a standard pattern, the standard pattern being an evaluation standard of the measurement target pattern;
   processing the graphic data to detect a coordinate of an edge point of the pattern;
   combining the edge points between the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points; and
   evaluating at least one of a relation of shape between the patterns, a relation of size between the patterns, and a relative location between the patterns on the basis of the prepared distance angle distribution map.

2. The pattern measurement method according to claim 1, wherein said evaluating includes extracting a characteristic point of the distance angle distribution map; and
   at least one of the relation of shape between the patterns, the relation of size between the patterns, and the relative location between the patterns is evaluated on the basis of the extracted characteristic point.

3. The pattern measurement method according to claim 2, wherein the distance angle distribution map is prepared for each of a plurality of sets of patterns, one set of patterns being constituted of a plurality of patterns including a common standard pattern, and
   said evaluating includes evaluating at least one of the relation of shape between the standard pattern and the measurement target pattern in each set, the relation of size between the standard pattern and the measurement target pattern in each set, and the relative location between the standard pattern and the measurement target pattern in each set on the basis of the characteristic point extracted from the plurality of prepared distance angle distribution maps.

4. The pattern measurement method according to claim 1, wherein said evaluating comprises calculating a dimension between specific portions of the patterns as an amount representing at least one of the relation of shape between the patterns, the relation of size between the patterns, and the relative location between the patterns.

5. The pattern measurement method according to claim 1, wherein the distance angle distribution map is prepared for each of a plurality of sets of patterns, one set of patterns being constituted of a plurality of patterns including a common standard pattern, and
   said evaluating comprises: performing a calculation process between distribution regions in the prepared distance angle distribution map to calculate a characteristic amount of the distance angle distribution map; and
   evaluating at least one of the relation of shape between the standard pattern and the measurement target pattern in each set, the relation of size between the standard pattern and the measurement target pattern in each set, and the relative location between the standard pattern and the measurement target pattern in each set on the basis of the calculated characteristic amount.

6. A pattern measurement method comprising: acquiring graphic data of a plurality of patterns including image data, the plurality of patterns including a measurement target pattern and a standard pattern, the standard pattern being an evaluation standard of the measurement target pattern;

processing the graphic data to detect a coordinate of an edge point of the pattern;

combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and extracting a characteristic point of the distance angle distribution map to evaluate at least one of a relation of shape between the patterns, a relation of size between the patterns, and a relative location between the patterns on the basis of the extracted characteristic point.

7. A pattern measure method comprising:

acquiring graphic data of a plurality of patterns including image data, the plurality of patterns including a measurement target pattern and a standard pattern, the standard pattern being an evaluation standard of the measurement target pattern;

processing the graphic data to detect a coordinate of an edge point of the pattern;

combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and calculating a characteristic amount of the distance angle distribution map to evaluate at least one of a relation of shape between the patterns, a relation of size between the patterns, and a relative location between the patterns on the basis of the calculated characteristic amount.

8. The pattern measurement method according to claim 7, wherein graphic data of the standard pattern is beforehand prepared prior to acquisition of the graphic data of the measurement target pattern.

9. The pattern measurement method according to claim 7, wherein said evaluating includes calculating an amount representing a difference in the shape between the patterns as the relation of shape between the patterns on the basis of the characteristic amount.

10. The pattern measurement method according to claim 7, wherein the graphic data of the standard pattern is CAD data or data of a simulation calculation result.

11. A pattern measure method comprising:

acquiring graphic data of a plurality of patterns including image data, wherein the plurality of patterns include a measurement target pattern of a target of measurement;

processing the graphic data to detect a coordinate of an edge point of the pattern;

combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern;

calculating a characteristic amount of the distance angle distribution map to evaluate at least one of a relation of shape between the patterns, a relation of size between the patterns, and a relative location between the patterns on the basis of the calculated characteristic amount; and selecting and setting a standard pattern constituting an evaluation standard of the measurement target pattern from the plurality of patterns.

12. The pattern measurement method according to claim 11, wherein the image data includes image data obtained with respect to the pattern of a non-defective, and the pattern of the non-defective is set as the standard pattern.

13. A manufacturing method of a semiconductor device using a pattern measurement method comprising:

acquiring graphic data of a plurality of patterns including image data, the plurality of patterns including a measurement target pattern and a standard pattern, the standard pattern being an evaluation standard of the measurement target pattern;

processing the graphic data to detect a coordinate of an edge point of the pattern;

combining the edge points between the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points; and evaluating at least one of a relation of shape between the patterns, a relation of size between the patterns, and a relative location between the patterns on the basis of the prepared distance angle distribution map.

14. A manufacturing method of a semiconductor device using a pattern measurement method comprising:

acquiring graphic data of a plurality of patterns including image data, the plurality of patterns including a measurement target pattern and a standard pattern, the standard pattern being an evaluation standard of the measurement target pattern;

processing the graphic data to detect a coordinate of an edge point of the pattern;

combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and extracting a characteristic point of the distance angle distribution map to evaluate at least one of a relation of shape between the patterns, a relation of size between the patterns, and a relative location between the patterns on the basis of the extracted characteristic point.

15. A manufacturing method of a semiconductor device using a pattern measurement method comprising:

acquiring graphic data of a plurality of patterns including image data, the plurality of patterns including a measurement target pattern and a standard pattern, the standard pattern being an evaluation standard of the measurement target pattern;
processing the graphic data to detect a coordinate of an edge point of the pattern;
combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and
calculating a characteristic amount of the distance angle distribution map to evaluate at least one of a relation of shape between the patterns, a relation of size between the patterns, and a relative location between the patterns on the basis of the calculated characteristic amount.

16. A computer readable medium to store a program which allows a computer to execute a pattern measurement method, said pattern measurement method comprising:
acquiring graphic data of a plurality of patterns including image data, the plurality of patterns including a measurement target pattern and a standard pattern, the standard pattern being an evaluation standard of the measurement target pattern;
processing the graphic data to detect a coordinate of an edge point of the pattern;
combining the edge points between the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points; and
evaluating at least one of a relation of shape between the patterns, a relation of size between the patterns, and a relative location between the patterns on the basis of the prepared distance angle distribution map.

17. A computer readable medium to store a program which allows a computer to execute a pattern measurement method, said pattern measurement method comprising:
acquiring graphic data of a plurality of patterns including image data, the plurality of patterns including a measurement target pattern and a standard pattern, the standard pattern being an evaluation standard of the measurement target pattern;
processing the graphic data to detect a coordinate of an edge point of the pattern;
combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and
extracting a characteristic point of the distance angle distribution map to evaluate at least one of a relation of shape between the patterns, a relation of size between the patterns, and a relative location between the patterns on the basis of the extracted characteristic point.

18. A computer readable medium to store a program which allows a computer to execute a pattern measurement method, said pattern measurement method comprising:
acquiring graphic data of a plurality of patterns including image data, the plurality of Patterns including a measurement target pattern and a standard pattern, the standard pattern being an evaluation standard of the measurement target pattern;
processing the graphic data to detect a coordinate of an edge point of the pattern;
combining the edge points of the patterns to make a pair of edge points and calculating a distance between the edge points constituting each pair of edge points and an angle between a straight line which connects the edge point to the other edge point and an arbitrary axial line with respect to each pair of edge points to prepare a distance angle distribution map which is a distribution map of the calculated distance and angle of the pair of edge points for each pattern; and
calculating a characteristic amount of the distance angle distribution map to evaluate at least one of a relation of shape between the patterns, a relation of size between the patterns, and a relative location between the patterns on the basis of the calculated characteristic amount.

19. A pattern measurement apparatus comprising:
an edge point detector which receives graphic data of a plurality of patterns including image data and processes the graphic data to detect a coordinate of an edge point of the pattern, the plurality of patterns including a measurement target pattern and a standard pattern, the standard pattern being an evaluation standard of the measurement target pattern;
a distance angle distribution map preparer which combines the edge points between the patterns to make a pair of edge points and calculates a distance between the edge points constituting each pair of edge points and an angle between a straight line to connect the edge point to the other edge point and an arbitrary axial line with respect to each pair of edge points to prepare a distribution map of the calculated distance and angle of the pair of edge points as a distance angle distribution map; and
an evaluator which evaluates at least one of a relation of shape between the patterns, a relation of size between the patterns, and a relative location between the patterns on the basis of the prepared distance angle distribution map.

20. The pattern measurement apparatus according to claim 19,
wherein the evaluator extracts a characteristic point of the distance angle distribution map, and evaluates at least one of the relation of shape between the patterns, the relation of size between the patterns, and the relative location between the patterns on the basis of the extracted characteristic point.

21. The pattern measurement apparatus according to claim 20,
wherein the distance angle distribution map preparer prepares the distance angle distribution map for each of a plurality of sets of patterns, each set of patterns being constituted of a plurality of patterns including a common standard pattern, and
the evaluator evaluates at least one of the relation of shape between the standard pattern and the measurement target pattern in each set, the relation of size between the standard pattern and the measurement target pattern in each set, and the relative location between the standard pattern and the measurement target pattern in each set on the basis of the characteristic point extracted from the plurality of prepared distance angle distribution maps.

22. The pattern measurement apparatus according to claim 19, wherein the evaluator calculates a dimension between specific portions of the patterns as an amount representing at least one of the relation of shape between the patterns, the relation of size between the patterns, and the relative location between the patterns.

23. The pattern measurement apparatus according to claim 19,
wherein the distance angle distribution map preparer prepares the distance angle distribution map for each of a plurality of sets of patterns, each set of patterns being constituted of a plurality of patterns including a common standard pattern, and
the evaluator performs a calculation process between distribution regions in the prepared distance angle distribution map to calculate a characteristic amount of the distance angle distribution map, and evaluates at least one of the relation of shape between the standard pattern and the measurement target pattern in each set, the relation of size between the standard pattern and the measurement target pattern in each set, and the relative location between the standard pattern and the measurement target pattern in each set on the basis of the calculated characteristic amount.

24. A pattern measurement apparatus comprising:
an edge point detector which receives graphic data of a plurality of patterns including image data and processes the graphic data to detect a coordinate of an edge point of the pattern, the plurality of patterns including a measurement target pattern and a standard pattern, the standard pattern being an evaluation standard of the measurement target pattern;
a distance angle distribution map preparer which combines the edge points of the patterns to make a pair of edge points and calculates a distance between the edge points constituting each pair of edge points and an angle between a straight line to connect the edge point to the other edge point and an arbitrary axial line with respect to each pair of edge points to prepare a distribution map of the calculated distance and angle of the pair of edge points as a distance angle distribution map for each pattern; and
an evaluator which extracts a characteristic point of the distance angle distribution map to evaluate at least one of a relation of shape between the patterns, a relation of size between the patterns, and a relative location between the patterns on the basis of the extracted characteristic point.

25. The pattern measurement apparatus according to claim 24,
wherein the evaluator calculates an amount representing a difference in the shape between the patterns as the relation of shape between the patterns on the basis of the characteristic point.

26. The pattern measurement apparatus according to claim 25,
wherein the graphic data of the standard pattern is CAD data or data of a simulation calculation result.

27. A pattern measurement apparatus comprising:
an edge point detector which receives graphic data of a plurality of patterns including image data and processes the graphic data to detect a coordinate of an edge point of the pattern, the plurality of patterns including a measurement target pattern and a standard pattern, the standard pattern being an evaluation standard of the measurement target pattern;
a distance angle distribution map preparer which combines the edge points of the patterns to make a pair of edge points and calculates a distance between the edge points constituting each pair of edge points and an angle between a straight line to connect the edge point to the other edge point and an arbitrary axial line with respect to each pair of edge points to prepare a distribution map of the calculated distance and angle of the pair of edge points as a distance angle distribution map for each pattern; and
an evaluator which calculates a characteristic amount of the distance angle distribution map to evaluate at least one of a relation of shape between the patterns, a relation of size between the patterns, and a relative location between the patterns on the basis of the calculated characteristic amount.

28. The pattern measurement apparatus according to claim 27,
wherein the plurality of patterns include a measurement target pattern constituting a target of measurement, and
the pattern measurement apparatus further comprises a standard pattern setter which selects and sets a standard pattern constituting an evaluation standard of the measurement target pattern from the plurality of patterns.

29. The pattern measurement apparatus according to claim 28,
wherein the image data includes image data obtained with respect to the pattern of a non-defective, and
the pattern of the non-defective is set as the standard pattern.

30. The pattern measurement according to claim 27,
wherein graphic data of the standard pattern is beforehand prepared prior to acquisition of the graphic data of the measurement target pattern.

* * * * *